United States Patent
Carson et al.

[11] Patent Number: 6,061,406
[45] Date of Patent: May 9, 2000

[54] MULTICHANNEL TIME SHARED DEMODULATOR AND METHOD

[75] Inventors: Lansing McLain Carson, Chandler; Stephen Chi humg Ma, Mesa; James William Startup, Tempe, all of Ariz.; Robert Jon Burdge, Paola, Kans.

[73] Assignee: Motorola, Inc., Schaumburg, Ill.

[21] Appl. No.: 09/027,762

[22] Filed: Feb. 23, 1998

[51] Int. Cl.[7] .................................................. H04L 1/04
[52] U.S. Cl. ........................ 375/260; 375/340; 375/347; 375/349
[58] Field of Search .................................. 375/340, 341, 375/343, 347, 349, 260, 261, 350, 368, 333; 370/537

[56] References Cited

U.S. PATENT DOCUMENTS 5,367,539  11/1994  Copley ..................................... 375/100
5,537,435   7/1996  Carney et al. ........................... 375/219
5,574,750  11/1996  Peponides et al. ...................... 375/224

*Primary Examiner*—Amanda T. Le
*Assistant Examiner*—Dac V. Ha
*Attorney, Agent, or Firm*—Gregory J. Gorrie

[57] ABSTRACT

A multichannel time shared demodulator (10) is implemented in an efficient ASIC architecture that provides routing-of user voice channels and access channels to a collection of time-shared processors for rapid signal detection, tracking and demodulation. The channels are routed in a random order and then processed by a time-shared symbol synchronization processor (18) for voice channels and a time-shared detection processor for access channels. The signals are over-sampled via a time-shared interpolation filter. The interpolation process yields a ten to one over sampling ration of all signals. A synchronized clock is used to choose the phases of the interpolation filter outputs.

27 Claims, 2 Drawing Sheets

MULTICHANNEL TIME SHARED DEMODULATOR AND METHOD

FIELD OF THE INVENTION

This invention pertains to communications systems in general and in particular to demodulators, and more particularly to signal acquisition, tracking and demodulation of multiple channels.

BACKGROUND OF THE INVENTION

Data communication receivers use digital demodulators to recover data from a received signal. A transmitter modulates a corresponding transmitted signal in a manner that conveys the data being communicated. A wide variety of modulation schemes are used in data communications, and many of these schemes, such as QPSK, conveys data through phase relationships between quadrature components of the transmitted signal. A digital demodulator in a data communication receiver operates in accordance with a selected modulation scheme to recover the data being conveyed. For space communication applications, many demodulators are typically required for multi-user communications. A large number of demodulators in a satellite orbiting the earth would be prohibitive due to cost, weight and power consumption. For these reasons and more, the use of many demodulators is not very practical in a commercial satellite communication system.

Thus what is needed is an apparatus and method that reduces the cost, weight and power consumption for demodulating multi-user communication data. What is also needed is a multichannel demodulator and method suitable for satellite communications.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

Figure 1:
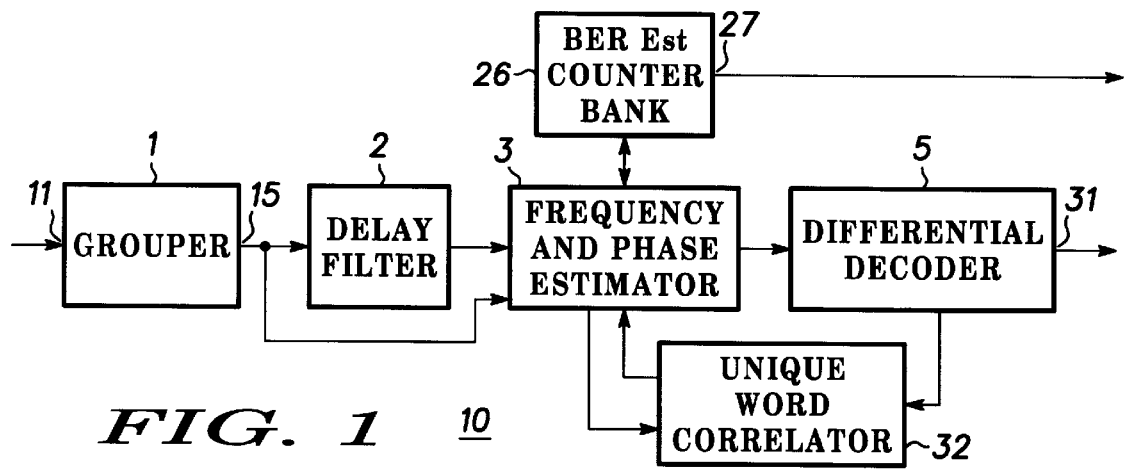
FIG. 1 illustrates a simplified block diagram of an embodiment of a multichannel time shared demodulator in accordance with a preferred embodiment of the invention.

The exemplification set out herein illustrates a preferred embodiment of the invention in one form thereof, and such exemplification is not intended to be construed as limiting in any manner.

DETAILED DESCRIPTION OF THE DRAWINGS

Generally, the present invention provides a multichannel time shared demodulator suitable for use in a satellite communication system. In the preferred embodiments, an efficient ASIC architecture provides routing of user voice channels and access channels to a collection of time-shared processors within the ASIC for rapid signal detection, tracking and demodulation. In these preferred embodiments, at least thirty-two channels may be concurrently processed with any combination of voice and access channels. Thirty-two of the ninety-six combined voice and access channels are routed in a random order and then processed by either a time-shared symbol synchronization processor for the voice channels or a time-shared detection processor for the access channels. The signals from each channel are supplied to the ASIC and sampled, in a preferred embodiment, at three and a third samples per second. In this embodiment, they are over-sampled by a factor of three via a time-shared interpolation filter. In the preferred embodiments, the interpolation process yields a ten to one over sampling ratio of all signals.

In accordance with these preferred embodiments, the symbol synchronization processor provides a synchronized clock which is used to choose one out of ten phases of the interpolation filter outputs. The phase selected corresponds to the peak phase of the symbol. The synchronized symbols are converted from rectangular format to polar format and the phase angles are used by a time shared frequency and phase estimator processor. The frequency and phase estimator processor acquires the carrier phase and frequency offset by first removing BPSK modulation of a preamble portion of the signal. Once the initial estimate of carrier frequency and phase has been made, further estimates are obtained through a decision aided feedback scheme. Suitable decision aided feedback schemes are know to those skilled in the art and are not discussed here. The frequency and phase estimator is followed by a unique word correlation which is used to mark the beginning of valid data an initiate differential decoding of the data.

In other preferred embodiments, the multichannel time shared demodulator of the present invention is provided in a parallel manner in a larger ASIC allowing more channels to be processed concurrently by a single ASIC. In another preferred embodiment, the multichannel time shared demodulator of the present invention is provided in a sequential manner with increased memory space allowing for increased channel processing capability. The multichannel time shared demodulator of the present invention is suitable to many modulation schemes. Any multiple channel QPSK demodulation may be implemented in accordance with the preferred embodiments of the present invention.

In the preferred embodiments, the efficient ASIC architecture provides flexibility in channel routing and provides a more than eight times gate count? improvement over current VLSI chip set implementations. Furthermore, the efficient ASIC architecture results in size, weight and power consumption improvements over current architectures.

FIG. 1 is a simplified block diagram of an embodiment of a multichannel time shared demodulator in accordance with a preferred embodiment of the invention. Demodulator 10 includes grouper 1, delay/filter 2, frequency and phase estimator 3, differential decoder 5, unique word correlator 4 and bit error rate (BER) counter bank 26. Grouper 1 is coupled to delay/filter 2 and to frequency and phase estimator 3. Frequency and phase estimator 3 is coupled with bit error rate (BER) counter bank 26, unique word correlator 32 and differential decoder 5.

In the preferred embodiment, multichannel demodulator 10 operates in a time division, multiple access (TDMA) burst environment. In such an environment, the input signal symbol timing and carrier phase rotation are desirably acquired with a minimum amount of overhead bits. The input signal to demodulator 10 is preferably of a QPSK modulation format with 40% square root raised cosine filtering. In the preferred embodiment, the symbol rate is 25 Ksps (50 Kbps) although other symbol rates are also suitable. In this embodiment, the symbol rate of the signal at the demodulator input is 2.66 mHz which produces 3⅓ samples per symbol for a total of 32 channels sequentially at the demodulator input. In the preferred embodiment, up to 96 channels from four fast fourier transform (FFT) processors are stored in a grouper memory and routed for further processing.

A memory map portion of grouper 1 controls the routing sequence of the signal channels. The memory map portion is preferably updated by an external microprocessor once per burst. A coherent symbol timing clock is used to latch the peak samples for input to frequency and phase estimator 3. The signals from the grouper go through delay filter 2 to be delayed while the symbol phase estimator acquires the symbol phase. In the preferred embodiment, delay filter 2 is a fifty sample delay line. Other delay lines, such as forty sample, are suitable. After delay filter 2, the signals are passed through a complex interpolation filter portion of delay filter 2. The filtered signal is interpolated preferably by a factor of three to a sample rate of 250 kHz per channel for a combined sample rate of, for example, 8 mHz per 32 channels. Other sample rates are suitable for the present invention. The interpolation process of delay filter 2 produces a number of complex samples per symbol in the signal. In the preferred embodiment, ten complex samples per signal are produced. The number of complex samples per symbol reduces degradation caused by non-optimum sampling of the matched filter output caused by a lower number of samples per signal. In the preferred embodiment of the present invention, delay filter 2 converts the complex symbols from a rectangular to a polar format. The angular portion is used for carrier frequency and phase estimation in frequency and phase estimator 3.

To estimate the phase, frequency and phase estimator 3 receives preferably one sample or phase angle per symbol, thus, for example, operating at a symbol rate of 25 kHz. Frequency and phase estimator 3 removes residual Doppler phase rotation present on any of the input samples, acquires, tracks and subtracts the carrier phase from the signal, performs the data decisions and outputs the resulting data to unique word correlator 32 and differential decoder 5 which processes the data. Differential decoder 5 provides a differentially decoded output signal.

Figure 2:
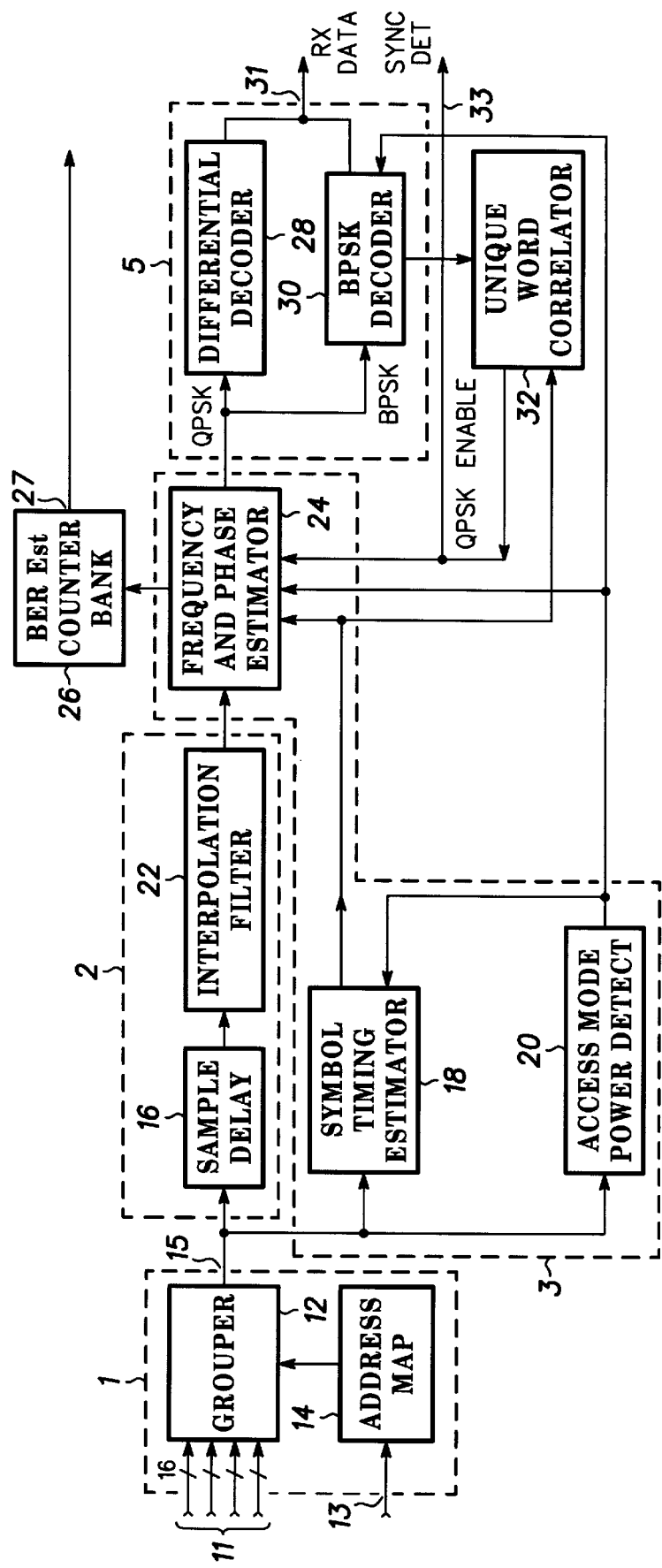
FIG. 2 illustrates a more detailed block diagram of an embodiment of the multichannel time shared demodulator of FIG. 1, in accordance with one preferred embodiment of the present invention.

FIG. 2 illustrates a more detailed block diagram of an embodiment of the multichannel time shared demodulator of FIG. 1, in accordance with one preferred embodiment of the present invention. Grouper 1 includes a grouper portion 12 and address map portion 14. Grouper portion 12 preferably has four 20-bit inputs 11 for receiving signal channels from the FFT processors. Grouper portion 12 is preferably a RAM base double buffer of preferably 80-bit by 32 words each. The outputs of these 80 by 32 buffers are provided to a set of 4:1 multiplexers which are coupled to a 2:1 multiplexer which provides grouper outputs 15. The routing sequence for the signal channels is stored in address map portion 14 and is updated regularly, preferably once per burst, and preferably by an external microprocessor at input 13. This configuration allows any combination of voice and access channels up to a predetermined total (in this embodiment, thirty-two) for routing in any sequence. This RAM-based design has at least a 4:1 improvement in gate count over conventional designs.

Delay filter 2 includes sample delay element 16 and interpolation filter 22. Sample delay element 16 and interpolation filter 22 may be referred to as a pipeline memory.

In the preferred embodiment, the input signal at grouper output 15 is delayed by sample delay element 16. In the preferred embodiment, the delay is a fifteen symbol delay line of 50 samples at 3⅓ samples per second. The delay allows the same data use for symbol synchronization to be used by the phase estimator. This, for example, increases the available settling time of the symbol timing estimate prior to any activity in the phase estimator and, accordingly, improves the performance of the phase estimator portion of frequency and phase estimator 24. Accordingly, the phase estimator portion, when enabled, has several symbols to settle prior to unique word arrival.

In the preferred embodiment of the present invention, the preamble portion of each TDMA burst received uses a BPSK modulation format. In this embodiment, the preamble contains a number of symbols of square wave data followed by a unique word of so many symbols. For example, the preamble may contain 16 symbols of square wave data which is followed by a 12 symbol unique word. It is desirable that the symbol timing and phase estimation processes be sufficiently settled prior to arrival of the unique word for the demodulator to operate optimally.

Digitally interpolation filter 22 increases the number samples per symbol prior to making data decisions. This helps to control any degradation caused by non-optimum sampling. The input is preferably over sampled by an integer multiple and zeros are inserted for the added sample points. For example, for a 3× interpolation, two zeros are inserted between each of the samples of the input. In the preferred embodiment, this architecture is RAM-based and is shared by each the selected routed channels. When the data rate is 2.66 mHz, for example, the internal operating rate and the output rate are 8 mHz. In the preferred embodiment, interpolation filter 22 is third-band eleven-tap finite impulse response (FIR) filter running at the higher output sampling rate. Tap coefficients are preferably selected for easy hardware implementation. It is desirable that side-lobe suppression of the filter response be at least 30 dB.

Symbol timing estimator 18 is an open loop correlator for recovering symbol timing from the complex samples output from interpolation filter 22. Timing is established prior to removal of the phase rotation caused by signal Doppler. Symbol timing estimator 18 determines which of the samples from interpolation filter 22 occurs at the time of the peak sample and latches this value for output to the phase estimator portion of frequency phase estimator 24. Symbol timing estimator 18 preferably processes an estimate of the magnitude of the complex input signal from grouper output 15. The magnitude, for example, may be derived by summing the absolute values of the real and imaginary parts of the signal. The magnitude estimate, while not independent of input signal Doppler as the actual magnitude of the complex samples would be, provides a signal which is used to satisfactorily extract timing information. This reduces hardware intensive calculations that may be required to produce a true magnitude.

For several reasons not discussed in detail here, the magnitude estimate typically contains a strong frequency component at twice the symbol rate frequency which is in phase with the symbol edges of the input signal. Symbol timing estimator 18 correlates the magnitude estimate with the conjugate of the complex local reference that has a frequency of twice the symbol rate. This correlation operation yields a complex value correction term whose phase is equal to the relative phase difference between the input signal and the local reference. The phase term is preferably extracted by an arc tangent process and converted to phase angles by a ROM table. The phase of the local reference is used to generate a set of clock signals which are proportional to the phase and coincide with the peak sample of the input signal. The clock derived from the reference is used to latch the appropriate input signals from output from symbol timing estimator 18.

The phase estimator portion of frequency and phase estimator 24, among other things, generates an estimate of the input phase and performs data decisions for both voice and access channels. In the preferred embodiment, the input to phase estimator portion is a phase angle that is a result of QPSK data modulation and yields phase angles of 45°, 135°, 225° or 315°. Superimposed on this phase information is a phase rotation due to any receiver location and/or Doppler effects. The underlying signal constellation may exhibit a fixed rotation or a rotational rate resulting in a fixed Doppler.

The phase estimator portion of frequency phase estimator 24 may develop a lagging bias when the input phase is rotating, for example, as a result of Doppler on the input samples. To help compensate for this effect, the frequency estimator portion adjusts for such phase lag in the phase estimate. This frequency aiding method uses a measure of the differential phase rotation between symbols. When the bias is not adequately corrected, the phase estimate exhibits an amount of static phase error for Doppler relative to the bit rate. The corrected phase estimate is calculated and used to remove the Doppler phase shift from the input signals. With the Doppler removed from the input samples, the data decisions are made. These data decisions refer back to the input with the appropriate delay properly aligned with the input data where they are subtracted from the input signal.

Unique word correlator 32, among other things, detects a unique word which is used to mark the beginning of valid data and initiate the differential decoding of the data by differential decoder portion 28. Preferably a unique word is chosen to have a low correlation with the square wave data. In the preferred embodiment, the input data stream is correlated with the predetermined unique word by passing it through an FIR filter whose coefficient pattern is the mere image of the predetermined unique word. The output of this correlation filter is compared to a threshold to make the detection decision. Preferably the unique word data is transmitted in a BPSK format which provides a 3 dB detection advantage over QPSK and other data formats. In a preferred embodiment of the present invention, the probability of declaring a detection falsely is lowered by only allowing detection to occur during a brief time-window based upon time of arrival uncertainty which, for example, may be +or − three symbols. BPSK decoder 30 provides the BPSK data to unique word correlator 32. In the preferred embodiment, the transmitted data is in QPSK format and is differentially encoded. The decoding of the input data occurs in differential decoder portion 28 and provides the received data at output port 31.

Figure 3:
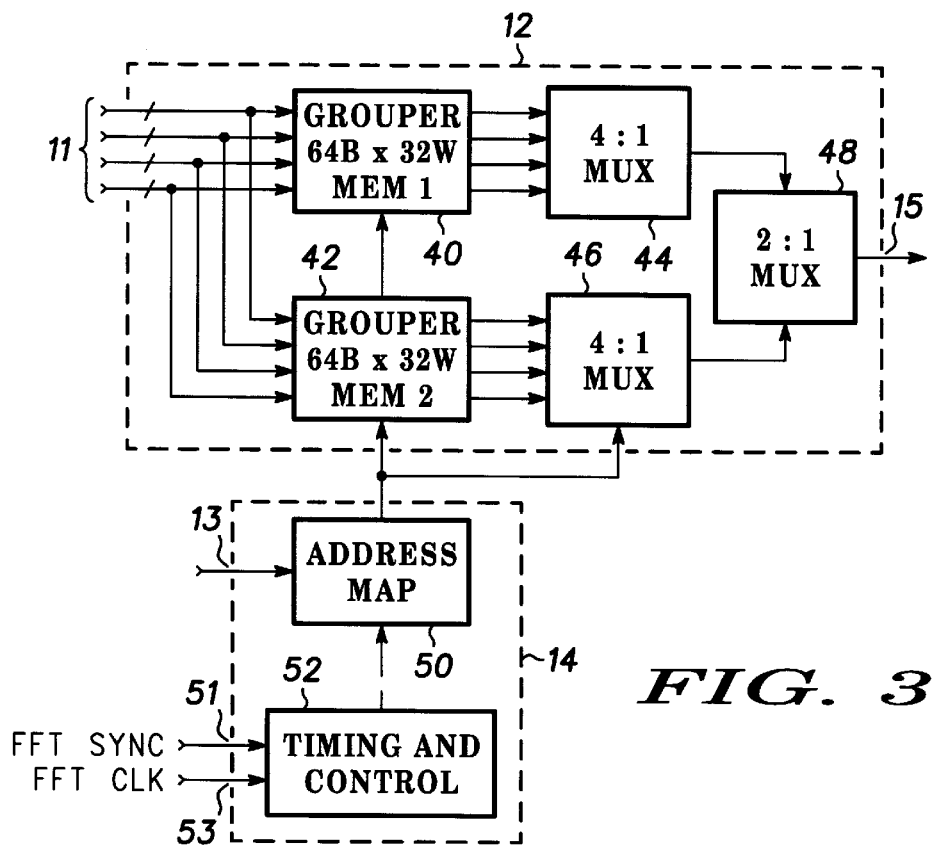
FIG. 3 illustrates a more detailed block diagram of an embodiment of the grouper and address map portions of the multichannel time shared demodulator of FIG. 2, in accordance with a preferred embodiment of the present invention.

FIG. 3 illustrates a more detailed block diagram of an embodiment of the grouper and address map portions of the multichannel time shared demodulator of FIG. 2, in accordance with a preferred embodiment of the present invention. Grouper portion 12 includes memories 40 and 42 which serve as a RAM-based double buffer of preferably 64-bit by 32-words each. Their outputs are provided to multiplexers 44 and 46 which are preferably 4:1 multiplexers which provide multiplex signals to 2:1 multiplexer 48. 2:1 multiplexer 38 provides a signal at grouper output 15. Although grouper portion 12 is shown as having four 16-bit input signals, the invention is equally suitable to more or less number of input signals. Furthermore, the embodiment shown in FIG. 3 shows two buffer memories 40 and 42. Other embodiments of the present invention may use more buffers, for example, for when more channels are utilized. Address map portion 50 stores the routing sequences for the channels that are to be routed. This address is preferably updated once per burst by a microprocessor through input 13. Address map portion 14 also includes a timing and control portion 52 and receives FFT sync inputs and FFT clock inputs. Accordingly, timing and synchronization of grouper portion 12 and address map portion 50 may be controlled. In the preferred embodiment of the present invention, the address map are updated every 90 milliseconds.

Accordingly, a multichannel time share demodulator has been described. In some of the preferred embodiments, the multichannel time share demodulator is suitable for use in many communication systems applications including satellite communication system. The efficient ASIC architecture provides for routing of user voice channels and access channels using a collection of time shared processors for rapid signal detection, tracking and demodulation. A subset of the total number of input channels may be concurrently processed. The efficient architecture results in cost, weight and power consumption improvements over typical multi-channel demodulator designs.

The invention has been described in conjunction with the illustrative embodiment of the invention. As will be apparent to those skilled in the art, various changes and modifications may be made to the above-described embodiment without departing from the spirit or scope of the invention. It is intended that the invention be limited not by the illustrative embodiment, but be limited only by the scope of the claims appended hereto.

What is claimed is:

1. A multichannel time shared demodulator comprising:

a grouper for selecting from a first plurality of input channels a second plurality of input channels smaller than said first plurality of input channels, said grouper coupled to a plurality of sources of said first plurality of input channels;

a delay filter for providing a peak value sample for each input channel of said second plurality of input channels, said delay filter coupled to said grouper;

a demodulator for providing said peak value sample for each input channel of said second plurality of input channels in digital form without Doppler effects, said demodulator coupled to said delay filter and to said grouper;

a differential decoder for decoding each peak value sample in digital form to binary information corresponding to information of said second plurality of input channels, said differential decoder coupled to said demodulator; and a unique word correlator for providing a timing signals for indicating said information is to be demodulated and for controlling said differential decoder, said unique word correlator coupled to said demodulator and to said differential decoder.

2. The multichannel time shared demodulator as claimed in claim 1, wherein said grouper includes an address map for storing an identity of said second plurality of input channels to be selected from said first plurality of input channels.

3. The multichannel time shared demodulator as claimed in claim 2, wherein said grouper further includes:

a first memory for storing a first portion of user information associated with said second plurality of input channels, said first memory coupled to said address map and to said plurality of sources of said first plurality of input channels;

a second memory for storing a second portion of said user information associated with said second plurality of input channels, said second memory coupled to said first memory, to said address map and to said plurality of sources; and said first and second memories operating in a ping pong fashion such that while said first memory is receiving user information said second memory is transmitting user information and operated such that when said second memory is receiving user information said first memory is transmitting user information.

4. The multichannel time shared demodulator as claimed in claim 3, wherein said grouper further includes:

multiplexer for providing an output of said first and second portions, said multiplexer coupled to said first and second memories; and timing and control element for controlling said address map and said first and second memories to select and store said user information for said second plurality of input channels, said timing and control element coupled to said address map and to said first and second memories.

5. The multichannel time shared demodulator as claimed in claim 2, where in said delay filter includes:

sample delay element for delaying user information associated with each of said second plurality of input channels, said sample delay element coupled to said grouper; and a filter for over-sampling said user information and providing a plurality of digital samples of said user information, said filter coupled to said sample delay element.

6. The multichannel time shared demodulator as claimed in claim 5, wherein said demodulator includes:

a symbol synchronizer coupled to said grouper; and a frequency and phase estimator coupled to said filter and to said symbol synchronizer.

7. The multichannel time shared demodulator as claimed in claim 6, wherein said differential decoder includes:

a differential decoder unit for producing a digital form of said user information, said differential decoder unit coupled to said frequency and phase estimator; and a bi-phase shift key decoder for determining a beginning of said user information, said bi-phase shift key decoder coupled to said frequency and phase estimator.

8. The multichannel time shared demodulator as claimed in claim 7, wherein there is further included a unique word correlator coupled to said bi-phase shift key decoder, to said frequency and phase estimator and to said symbol synchronizer.

9. The multichannel time shared demodulator as claimed in claim 8, where there is further included a bit error rate estimator counter bank for providing estimates of a bit error rate associated with a demodulation of said user information, said bit error rate estimator counter bank coupled to said frequency and phase estimator.

10. An application specific integrated circuit (ASIC) for demodulating a multichannel time-shared signals comprising:

a grouper for selecting from a first plurality of input channels a second plurality of input channels smaller than said first plurality of input channels, said grouper coupled to a plurality of sources of said first plurality of input channels; and delay filter for providing a peak value sample for each input channel of said second plurality of input channels, said delay filter coupled to said grouper; and a differential decoder for decoding said peak value samples in digital form to binary information corresponding to information of said second plurality of input channels.

11. An ASIC as claimed in claim 10 further comprising:

a demodulator for providing said peak value sample for each input channel of said second plurality of input channels in digital form without Doppler effects, said demodulator coupled to said delay filter and to said grouper; and a unique word correlator for providing a timing signals for indicating said information is to be demodulated and for controlling said differential decoder, said unique word correlator coupled to said demodulator and to said differential decoder.

12. The ASIC as claimed in claim 11, wherein said grouper includes an address map for storing an identity of said second plurality of input channels to be selected from said first plurality of input channels.

13. The ASIC as claimed in claim 12, wherein said grouper further includes:

a first memory for storing a first portion of user information associated with said second plurality of input channels, said first memory coupled to said address map and to said plurality of sources of said first plurality of input channels;

a second memory for storing said user information of a second portion of said second plurality of input channels, said second memory coupled to said first memory, to said address map and to said plurality of sources; and said first and second memories operating in a ping pong fashion such that while said first memory is receiving user information said second memory is transmitting user information and operated such that when said second memory is receiving user information said first memory is transmitting user information.

14. The ASIC as claimed in claim 13, wherein said grouper further includes:

multiplexer for providing an output of said first and second portions of said second plurality of input channels, said multiplexer coupled to said first and second memories; and timing and control element for controlling said address map and said first and second memories to select and store said user information for said second plurality of input channels, said timing and control element coupled to said address map and to said first and second memories.

15. The ASIC as claimed in claim 12, where in said delay filter includes:

sample delay element for delaying user information associated with each of said second plurality of input channels, said sample delay element coupled to said grouper; and filter for over-sampling said user information and providing a plurality of digital samples of said user information, said filter coupled to said sample delay element.

16. The ASIC as claimed in claim 15, wherein said demodulator includes:

a symbol synchronizer coupled to said grouper; and a frequency and phase estimator coupled to said filter and to said symbol synchronizer.

17. The ASIC as claimed in claim 16, wherein said differential decoder includes:

a differential decoder unit for producing a digital form of said user information, said differential decoder unit coupled to said frequency and phase estimator; and a bi-phase shift key decoder for determining a beginning of said user information, said bi-phase shift key decoder coupled to said frequency and phase estimator.

18. The ASIC as claimed in claim 17, wherein there is further included a unique word correlator coupled to said bi-phase shift key decoder, to said frequency and phase estimator and to said symbol synchronizer, and where there is further included a bit error rate estimator counter bank for providing estimates of a bit error rate associated with a demodulation of said user information, said bit error rate estimator counter bank coupled to said frequency and phase estimator.

19. A method of demodulating multiple input channels comprising the steps of:

selecting from a first plurality of input channels a second plurality of input channels smaller than said first plurality of input channels;

providing a peak value sample for each input channel of said second plurality of input channels in digital form without Doppler effects;

decoding each peak value sample in digital form to binary information corresponding to information of said second plurality of input channels; and providing timing signals for indicating said binary information is to be demodulated and for controlling said step of decoding.

20. The method as claimed in claim 19 further comprising the steps of:

storing, in a first memory, a first portion of user information associated with said second plurality of input channels;

storing, in a second memory, said user information; and operating said first and second memory in a ping pong fashion such that while said first memory is receiving user information said second memory is transmitting user information and operated such that when said second memory is receiving user information said first memory is transmitting user information.

21. The method as claimed in claim 20 further comprising the steps of:

providing a multiplexed output of said first and second portions of said user information; and controlling an address map and said first and second memory to select and store said user information for said second plurality of input channels.

22. The method as claimed in claim 19 further comprising the step of storing an identity of said second plurality of input channels to be selected from said first plurality of input channels.

23. The method as claimed in claim 22 wherein said providing a peak value sample step includes the steps of:

delaying, by sample delay element, user information of each of said second plurality of input channels; and over sampling said user information of each of said channels of said second plurality of input channels and providing a plurality of digital samples of said user information.

24. The method as claimed in claim 22 further comprising the steps of:

providing an estimate of input phase, said estimate of input phase having a phase lag;

determining a frequency estimate of Doppler present on input signal to estimate of phase lag present by measuring differential phase rotation between symbols; and rotating said estimate of input phase based on estimate of phase lag.

25. The method as claimed in claim 22 wherein said decoding step includes the steps of:

producing a digital form of user information with a differential decoder; and determining, with a bi-phase shift key decoder, a beginning of said user information.

26. The method as claimed in claim 22 further comprising the steps of determining a beginning of user information by detecting a unique word with a unique word correlator.

27. The method as claimed in claim 22 further comprising the steps of providing estimates of a bit error rate associated with a demodulation of user information.

* * * * *